United States Patent [19]

Yamada

[11] 4,086,602
[45] Apr. 25, 1978

[54] PRINTING VIDEO SIGNAL INFORMATION USING INK DROPS

[75] Inventor: Takahiro Yamada, Hitachi, Japan

[73] Assignee: Hitachi, Ltd., Japan

[21] Appl. No.: 660,783

[22] Filed: Feb. 24, 1976

[30] Foreign Application Priority Data

Feb. 26, 1975   Japan ................................. 50-22817

[51] Int. Cl.² ............................................ G01D 15/18
[52] U.S. Cl. .................................................... 346/75
[58] Field of Search ........................................ 346/75

[56] References Cited

U.S. PATENT DOCUMENTS

| | | | |
|---|---|---|---|
| 3,465,351 | 9/1969 | Keur et al. | 346/75 |
| 3,689,936 | 9/1972 | Dunlavey | 346/75 |
| 3,709,432 | 1/1973 | Robertson | 346/75 X |
| 3,736,593 | 5/1973 | Keur et al. | 346/75 |
| 3,810,194 | 5/1974 | Tokunaga et al. | 346/75 |
| 3,828,354 | 8/1974 | Hilton | 346/75 X |
| 3,866,237 | 2/1975 | Meier | 346/75 |
| 3,877,036 | 4/1975 | Loeffler et al. | 346/75 |
| 4,027,310 | 5/1977 | Baker et al. | 346/75 |

OTHER PUBLICATIONS

Phillips, D. W., Horizontal Ink Stream Deflection During Vertical Deflection Sensitivity Adjustment, IBM Tech. Disc. Bull., vol. 16, No. 3, Aug. 1973, pp. 773-774.

West, D. L. et al., Ink Jet Deflection Plate Arrangement, IBM Tech. Disc. Bull., vol. 15, No. 2, Jul. 1972, pp. 476-477.

*Primary Examiner*—George H. Miller, Jr.
*Attorney, Agent, or Firm*—Craig & Antonelli

[57] ABSTRACT

Ink drop writing apparatus wherein ink drops can be deflected in X-axis and Y-axis directions on a writing medium, all the ink drops which are not deflected in one axial direction, e.g., the Y-axis direction, are captured by a waste catcher, and selected ones of the ink drops which are deflected in the Y-axis direction are deflected in the X-axis direction in response to video signals. The thus deflected ink drops intercept a writing medium and stick to desired positions on the writing medium, thus to provide a recording on the writing medium. Stains on the writing medium due to unnecessary or undesired ink drops is thereby reduced.

6 Claims, 2 Drawing Figures

PRINTING VIDEO SIGNAL INFORMATION USING INK DROPS

BACKGROUND OF THE INVENTION

This invention relates to apparatus for printing video signal information using ink drops. More particularly, it relates to such an apparatus which does not produce stains on the writing medium during unstable operation thereof, particularly at starting.

The typical ink drop writing apparatus is constructed such that ink is emitted in the form of a stream which is subsequently separated into ink drops. The ink drops are electrostatically deflected while flying, the deflected ink drops adhere to desired positions on a writing medium, and an information is recorded by the combination of "dots" formed by the adhesion of the ink drops on the writing medium.

In order to perform the electrostatic deflection of the ink drops, an electrostatic force is generally utilized. More specifically, charges in an amount corresponding to the desired or required amount of deflection are bestowed on the ink drops, and the charged drops are subjected to an electrostatic force while flying in a predetermined electrostatic field (in a space between two electrode plates across which a voltage is applied). The ink drops unnecessary for the recording are captured by a waste catcher, and do not reach the writing medium. In the case where the ink drops are to be deflected in only one direction with respect to the direction of rectilinear advance (no deflection), the waste catcher is located at a rectilinear-advance position. In the case where it is desired to make the amount of deflection large, the ink drops are deflected bidirectionally with respect to the rectilinear advance. At this time, it is common that the waste catcher is located at a predetermined (maximum) deflection position in either direction.

In the bidirectional deflection system, the ink drops unnecessary for the recording need to be deflected to the position of the waste catcher with at least a minimum degree of reliability. Disadvantageously, however, the separation and creation of the ink drops is unstable and an accurate deflection cannot be obtained during the starting-up operation of the ink drop writing apparatus, so that the ink drops miss the waste catcher and stain the apparatus as well as the writing medium.

SUMMARY OF THE INVENTION

An object of this invention is to provide, in a bidirectional deflection type system, an ink drop writing apparatus according to which the possibility of stain of the apparatus and the writing medium is greatly reduced even when the separation and creation of ink drops is unstable and an accurate deflection thereof is impossible, particularly during starting up of the apparatus.

A characterizing feature of this invention resides in that ink drops which are emitted from a nozzle can be deflected in a first axial direction on a writing medium and a second axial direction orthogonally intersecting the first axial direction, that all the ink drops which are not deflected in the first axial direction are captured by a waste catcher, and that selected ones of the ink drops which are deflected in the first axial direction are deflected in the second axial direction and directed to desired positions of the writing medium so as to perform recording.

DESCRIPTION OF THE PREFERRED EMBODIMENTS

Figure 1:
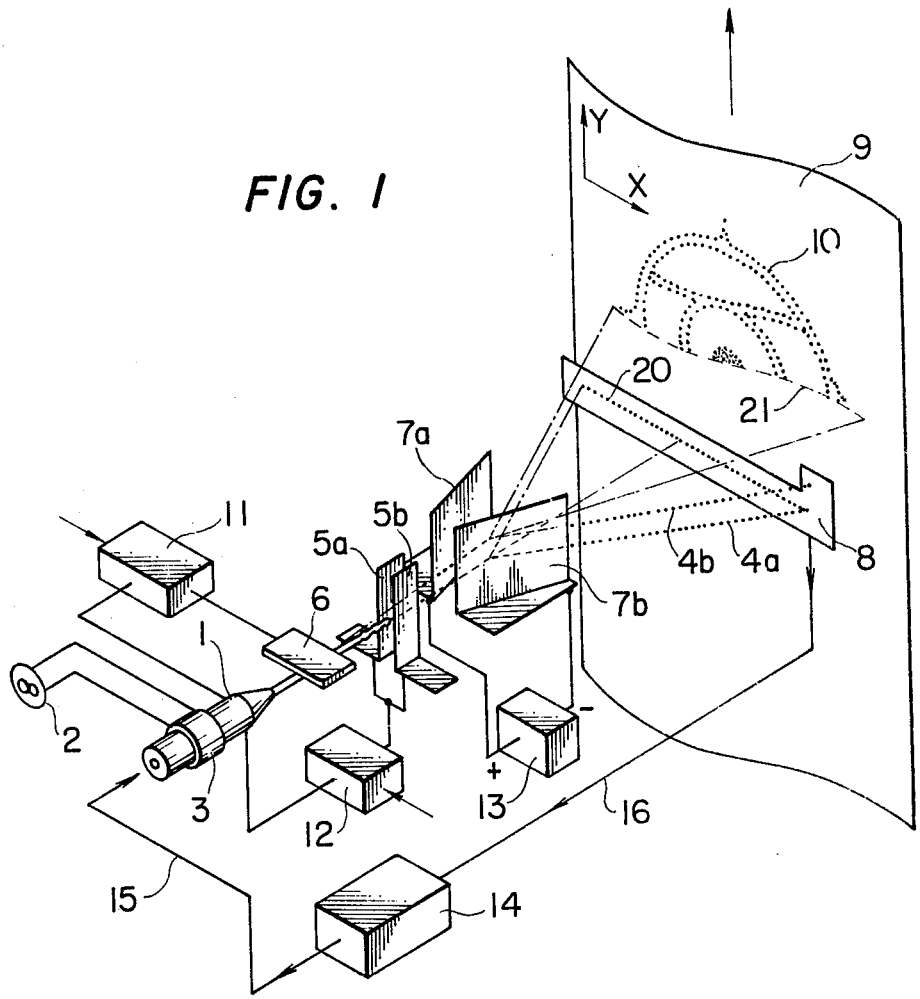
FIG. 1 is a schematic diagram of an arrangement for an ink drop recording system in accordance with this invention.

In FIG. 1 an ink jet nozzle 1 is mechanically vibrated by a piezoelectric crystal 3 which is supplied with power from a high-frequency power source 2. Ink pressurized and fed to the nozzle 1 is emitted in the form of an ink stream 4 from a nozzle hole. The initial portion of the ink stream 4 near the nozzle is divided into ink drops. At the position at which the ink drops are separated and created from the ink stream 4, there is disposed a pair of charging electrodes 5a and 5b for providing the ink drops with charges which will be responsive to a video signal. The charging electrodes 5a and 5b are parallel plates disposed with the air gap therebetween extending longitudinally in a first axial direction, for example, the Y-axis direction, as will be stated later (in the following explanation, the first axial direction is to correspond to the Y-axis direction).

Figure 2:
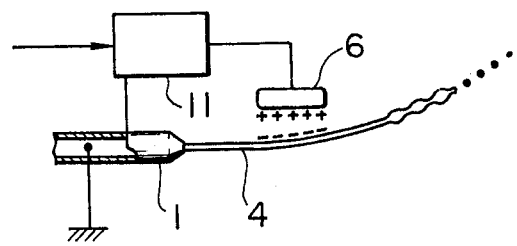
FIG. 2 is a detail drawing illustrating an ink drop forming apparatus in accordance with this invention.

In the region in which the ink emitted from the nozzle 1 is in the form of a stream, a first deflecting electrode 6 is spaced above the stream by a slight air gap in the Y-axis direction, as seen in FIG. 2. Second deflecting electrodes 7a and 7b, which are provided in the region beyond where the ink drops are formed are so disposed as to deflect the ink drops in a second axial direction, for example, the X-axis direction, rectilinear to the traveling direction of the drops. The second electrodes 7a and 7b are positioned so that the air gap formed therebetween is wider at the downstream end part than at the upstream end part.

A waste catcher 8 is so arranged as to intercept the path of the ink drops 4a which travel without being deflected in the Y-axis direction, and to also intercept the path of the ink drops 4b which have been deflected in the Y-axis direction and to a limit in the X-axis direction. The ink drops which have traveled without being captured by the waste catcher 8 are intercepted by and adhere to a writing medium 9 to form "dots", which record an information 10. The writing medium 9 is moved in the Y-axis direction by known means (not shown) as indicated by the arrow A.

A control circuit 11 serves to apply to the first deflecting electrode 6 a voltage which produces a force for deflecting the ink stream 4, as seen in FIG. 2. The control circuit 11 operates so as to supply the voltage to the first deflecting electrode 6 under stable conditions for creating the ink drops. A video signal control circuit 12 operates to supply a voltage between the nozzle 1 and the charging electrodes 5a, 5b at a polarity responsive to the required deflection direction of the ink drop and at a charge in an amount responsive to the amount of deflection required. A constant-voltage source 13 applies a constant bias voltage on the second deflecting electrodes 7a and 7b.

The ink pressuring and feeding device 14 is a conventional device which comprises an ink tank and a pressure pump (not shown). It operates so that the pressurized ink may be fed to the nozzle 1 through a conduit 15 and that the ink captured by the waste catcher 8 may be recovered and returned to the ink tank through a conduit 16.

In starting the writing apparatus having the above-described construction, the nozzle 1 is mechanically vibrated at the frequency of the high-frequency power source 2 by the piezoelectric crystal 3, and the ink under pressure is fed from the ink pressurizing and feeding device 14 through the conduit 15 to the nozzle 1.

The ink under pressure is emitted in the form of an ink stream 4 from the front end of the nozzle 1. At the initial portion of the ink stream emitted from the nozzle 1, "constructions" formed by the mechanical vibration of the nozzle 1 grow and are separated to create a stream of individual ink drops. If no voltage is applied to the first deflecting electrode 6, the ink stream 4 will advance rectilinearly and will not be deflected in the Y-axis direction. At this time, the paths of the ink drops created from the ink stream 4 will pass through the dot line 20 on the waste catcher 8.

Under these conditions, if the voltage difference between the nozzle 1 and the charging electrodes 5a, 5b is zero, for example, in the absence of a video signal, the ink drops will not be charged. The ink drops accordingly will be subjected to no electrostatic deflection force by the second deflecting electrodes 7a and 7b, so that they will travel rectilinearly without being deflected in the X-axis direction either.

Subsequently, when a video signal voltage which is positive at the nozzle 1 and negative at the charging electrodes 5a, 5b is applied, the ink drop is charged positively during the separation and creation of the drop. It therefore will be attracted by and deflected towards the deflecting electrode 7b by an electrostatic force while passing through the space between the second deflecting electrodes 7a and 7b. On the other hand, where the ink drop is charged negatively by a video signal voltage of opposite polarity, it is deflected towards the deflecting electrode 7a while passing through the space between the second deflecting electrodes 7a and 7b. At this time, if the ink drop is properly charged by the video signal voltage, it will be deflected by a predetermined amount and will strike a predetermined position on the waste catcher 8 (a part at the right end as viewed in FIG. 1).

The information signal voltage applied to the charging electrodes 5a, 5b is pulsatile. Therefore, unless the separation of the ink drop and the phase of the generation of the pulse voltage coincide, the corresponding relation between the magnitude of the video signal voltage and the amount of charge on the ink drop will be lost, and the predetermined deflection will not be attainable. Under these conditions, therefore, a conventional ink drop detector (not shown) may be provided at a predetermined position so as to detect the correspondence between the generation of the ink drop and the phase of the information signal voltage. One such phase detection system is disclosed in U.S. Pat. No. 3,465,351 to Keur, et al, dated Sept. 2, 1969. Only after it has been made certain in this way that the phase of the separation and creation of the ink drop and the phase of the information signal voltage are coincident will the control voltage be applied to the first deflecting electrode 6. Then, the ink stream 4 will be deflected towards the electrode 6 by the required amount (in the Y-axis direction).

More specifically, when the deflecting voltage (positive) is applied to the first deflecting electrode 6, as illustrated in FIG. 2, negative charges are induced at that part of the ink stream 4 which is opposed to the deflecting electrode 6. Since an attractive force acts on the negative charges owing to the electric field of the deflecting electrode 6, the ink stream 4 is deflected towards the deflecting electrode 6 (in the direction of the Y-axis). When the ink stream 4 is deflected in the direction of the first axis (Y-axis) in this manner, the path of the ink drop separated and created from the initial portion of the ink stream 4 moves in a direction parallel to the Y-direction. The ink drop departs from the dot line 20 on the waste catcher 8 and moves onto another path, for example, a supposed dot line 21, on which it will strike the writing medium 9. Under this condition, the ink drop required for the recording has applied to it charges, corresponding to the desired adhering position thereof, in accordance with the information signal voltage. Then, the ink drop takes a path which avoids the waste catcher 8 (a protruding part at the right end as viewed in FIG. 1) and clings to the selected position on the line 21 on the recording medium 9, so that the recording dot can be formed. In contrast, ink drops which are unnecessary for dot formation are subjected to a deflection of the maximum predetermined amount and are captured by the waste catcher 8 (the protruding part).

In accordance with the features described above, all the ink drops are captured by the waste catcher 8 during conditions in which the separation and creation of the ink drop is unstable (especially during starting up of the apparatus), and hence, the apparatus and the writing medium 9 are not stained. It is accordingly an advantage that, during the starting-up operation, the ink drops are charged by applying thereto a phase detecting signal of a predetermined magnitude corresponding to the information signal voltage, whereupon they are deflected and subjected to a phase detection. Such has been feasible within the extent of the waste catcher by deflecting the ink drops in the direction opposite to a nodeflection position or a recording information in the case where the deflection of the ink drops is unidirectional. In ink drop writing apparatus of the bidirectional deflection type, however, the technique has heretofore been impossible.

Although in the foregoing embodiment the deflecting force is an electrostatic force, it will be very easily understood that this invention is also applicable to an ink drop writing apparatus in which ink with magnetic powder mixed therein is deflected by an electromagnetic force. It is also possible to execute the deflection in the first axial direction by an electromagnetic force and that in the second axial direction by an electrostatic force, and further to employ the converse combination.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. In an apparatus for printing video signal information using ink drops, wherein ink under pressure is supplied to a nozzle which is vibrated by a transducer driven from a high-frequency power source to produce a stream of ink which separates into individual ink drops directed toward a recording medium, the improvement comprising means responsive to a video signal for applying a charge of selected magnitude and polarity to the ink drops as they are formed from said stream, first deflecting means responsive to a control signal for selectively deflecting said ink stream before separation in a first axial direction, second deflecting means for deflecting said ink drops in a second axial direction transverse to said first axial direction, and waste catcher means disposed in the path of any ink drop not subject to deflection by said first deflecting means for intercepting such ink drops, wherein said waste catcher means extends over a full deflection width in said second axial direction in order to capture all ink drops which are not deflected in said first axial direction, said waste catcher means further including a portion extending a predetermined distance in said first axial direction in order to intercept any ink drops which are deflected in said first axial direction but are unnecessary to recording.

2. The apparatus according to claim 1 wherein said second deflecting means is formed by a pair of deflection plates and a constant potential source connected therebetween.

3. The apparatus according to claim 1 wherein said first deflecting means comprises means for providing a constant deflecting force which acts on said ink stream before separation during a recording operation.

4. The apparatus according to claim 3 wherein said first deflecting means is formed by an electrode disposed adjacent said ink stream at a position displaced from said ink stream in a direction parallel to said first axial direction and means for selectively applying a control signal to said electrode.

5. In an apparatus for printing video signal information using ink drops, wherein ink under pressure is supplied to a nozzle which is vibrated by a transducer driven from a high-frequency power source to produce a stream of ink directed along a rectilinear path and which separates into individual ink drops directed toward a recording medium, the improvement comprising means responsive to a video signal for applying a charge of selected magnitude and polarity to the ink drops as they are formed from said stream, first deflecting means responsive to a control signal for selectively deflecting said ink stream away from said rectilinear path in a first axial direction before separation into said ink drops, wherein said ink stream is deflected during recording operation free of unstable ink drop formation occurring during starting, second deflecting means for deflecting said ink drops to both sides of said rectilinear path in a second axial direction transverse to said first axial direction, and waste catcher means extending over a full deflection width in said second axial direction for intercepting all ink drops which are not deflected in said first axial direction by said first deflecting means during unstable ink drop formation; wherein said waste catcher means also extends for a prescribed distance in said first axial direction at a predetermined position in order to capture ink drops which are deflected at predetermined amounts in said second axial direction.

6. The apparatus according to claim 5, wherein said second deflecting means is formed by a pair of deflection plates and a constant potential source connected therebetween.

* * * * *